(12) United States Patent
Shimizu

(10) Patent No.: US 10,309,325 B2
(45) Date of Patent: Jun. 4, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Hajime Shimizu, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/849,802

(22) Filed: Dec. 21, 2017

(65) Prior Publication Data

US 2018/0179968 A1    Jun. 28, 2018

(30) Foreign Application Priority Data

Dec. 22, 2016   (JP) ................. 2016-249850

(51) Int. Cl.
    *F02D 41/02*     (2006.01)
    *F02B 23/10*     (2006.01)
    (Continued)

(52) U.S. Cl.
    CPC ....... *F02D 41/0027* (2013.01); *F02D 35/028* (2013.01); *F02D 41/3047* (2013.01); *F02D 41/403* (2013.01); *F02B 9/02* (2013.01); *F02D 41/3005* (2013.01); *F02D 2200/02* (2013.01); *Y02T 10/44* (2013.01)

(58) Field of Classification Search
    CPC ............. F02D 41/0027; F02D 41/3047; F02D 35/028; F02D 41/403; F02D 2200/02; Y02T 10/44; F02B 9/02
    See application file for complete search history.

(56) References Cited

U.S. PATENT DOCUMENTS

2002/0053336 A1   5/2002   Nogi et al.
2003/0230276 A1   12/2003   Kataoka et al.
(Continued)

FOREIGN PATENT DOCUMENTS

EP      1 867 857 A1    12/2007
JP      2001-003800 A    1/2001
(Continued)

*Primary Examiner* — Hieu T Vo
*Assistant Examiner* — Arnold Castro
(74) *Attorney, Agent, or Firm* — Finnegan, Henderson, Farabow, Garrett & Dunner, LLP

(57) ABSTRACT

A control device for an internal combustion engine provided with a combustion control part sequentially injecting at least a primary auxiliary fuel, secondary auxiliary fuel, and main fuel from a fuel injector in predetermined operating regions, causing compressive ignition sequentially from a premix containing the primary auxiliary fuel after injection of the main fuel, and causing compressive ignition of a premix containing the main fuel using heat generated when causing compressive ignition of a premix containing the secondary auxiliary fuel, the combustion control part setting a target injection amount and target injection timing of the primary auxiliary fuel so that a peak value and a slant of a heat generation rate pattern formed by a premix containing the primary auxiliary fuel is smaller than peak values and slants of heat generation rate patterns formed by the premixes containing the secondary auxiliary fuel and the main fuel.

7 Claims, 6 Drawing Sheets

(51) Int. Cl.
*F02D 41/38* (2006.01)
*F02D 41/00* (2006.01)
*F02D 41/30* (2006.01)
*F02D 41/40* (2006.01)
*F02D 35/02* (2006.01)
*F02B 9/02* (2006.01)

(56) References Cited

U.S. PATENT DOCUMENTS

| | | | |
|---|---|---|---|
| 2005/0274352 A1* | 12/2005 | Canale | F02D 35/023 123/299 |
| 2008/0243358 A1* | 10/2008 | Kojima | F02D 35/025 701/102 |
| 2010/0242900 A1 | 9/2010 | Hitomi et al. | |
| 2010/0268442 A1* | 10/2010 | Kabashima | F02D 41/0025 701/103 |
| 2011/0180039 A1* | 7/2011 | Nada | F02D 35/02 123/445 |
| 2012/0046854 A1 | 2/2012 | Sangkyu et al. | |
| 2013/0340720 A1* | 12/2013 | Kuzuyama | F02D 41/402 123/478 |
| 2015/0053171 A1* | 2/2015 | Sasaki | F02B 11/00 123/27 R |
| 2015/0090217 A1* | 4/2015 | Kuzuyama | F02D 41/1497 123/299 |
| 2018/0066600 A1 | 3/2018 | Harada et al. | |
| 2018/0202377 A1* | 7/2018 | Nakamura | F02D 41/402 |
| 2018/0347503 A1* | 12/2018 | Kuzuyama | F02D 41/401 |

FOREIGN PATENT DOCUMENTS

| | | |
|---|---|---|
| JP | 2004-003439 A | 1/2004 |
| JP | 2007-332858 A | 12/2007 |
| JP | 2010-236460 A | 10/2010 |
| JP | 2010-236477 A | 10/2010 |
| JP | 2012-062880 A | 3/2012 |
| JP | 2016-180326 A | 10/2016 |

* cited by examiner

CONTROL DEVICE FOR INTERNAL COMBUSTION ENGINE

CROSS-REFERENCE TO RELATED APPLICATION

This application claims priority based on Japanese Patent Application No. 2016-249850 filed with the Japan Patent Office on Dec. 22, 2016, the entire contents of which are incorporated into the present specification by reference.

TECHNICAL FIELD

The present disclosure relates to a control device for an internal combustion engine.

BACKGROUND ART

JP2012-062880A discloses, as a conventional control device for an internal combustion engine, a device configured to switch a mode of combustion in accordance with an engine operating state to premix charged compressive ignition or diffusive combustion and configured to inject fuel three times interspaced by predetermined time intervals when performing premix charged compressive ignition.

SUMMARY OF DISCLOSURE

However, JP2012-062880A does not allude to what kind of shape to make a heat generation rate pattern (combustion waveform) when making premixes formed by the fuel injections burn when performing premix charged compressive ignition. There is the problem that the combustion noise increases depending on the shape of the heat generation rate pattern when making the premix formed by the first fuel injection burn.

The present disclosure was made focusing on such a problem and has as its object the suppression of combustion noise when performing premix charged compressive ignition.

To solve this problem, according to one aspect of the present disclosure, there is provided a control device for an internal combustion engine, for controlling an internal combustion engine provided with an engine body and a fuel injector injecting fuel into a combustion chamber of the engine body, comprising a combustion control part sequentially injecting at least a primary auxiliary fuel, secondary auxiliary fuel, and main fuel from the fuel injector in predetermined operating regions, causing compressive ignition sequentially from a premix containing the primary auxiliary fuel after injection of the main fuel, and causing compressive ignition of a premix containing the main fuel using heat generated when causing compressive ignition of a premix containing the secondary auxiliary fuel. Further, the combustion control part is configured so as to set a target injection amount and target injection timing of the primary auxiliary fuel so that a peak value and a slant of a heat generation rate pattern formed by the premix containing the primary auxiliary fuel is smaller than peak values and slants of heat generation rate patterns formed by the premixes containing the secondary auxiliary fuel and the main fuel.

According to this aspect of the present disclosure, it is possible to suppress the combustion noise when performing premix charged compressive ignition.

DESCRIPTION OF EMBODIMENTS

Figure 1:
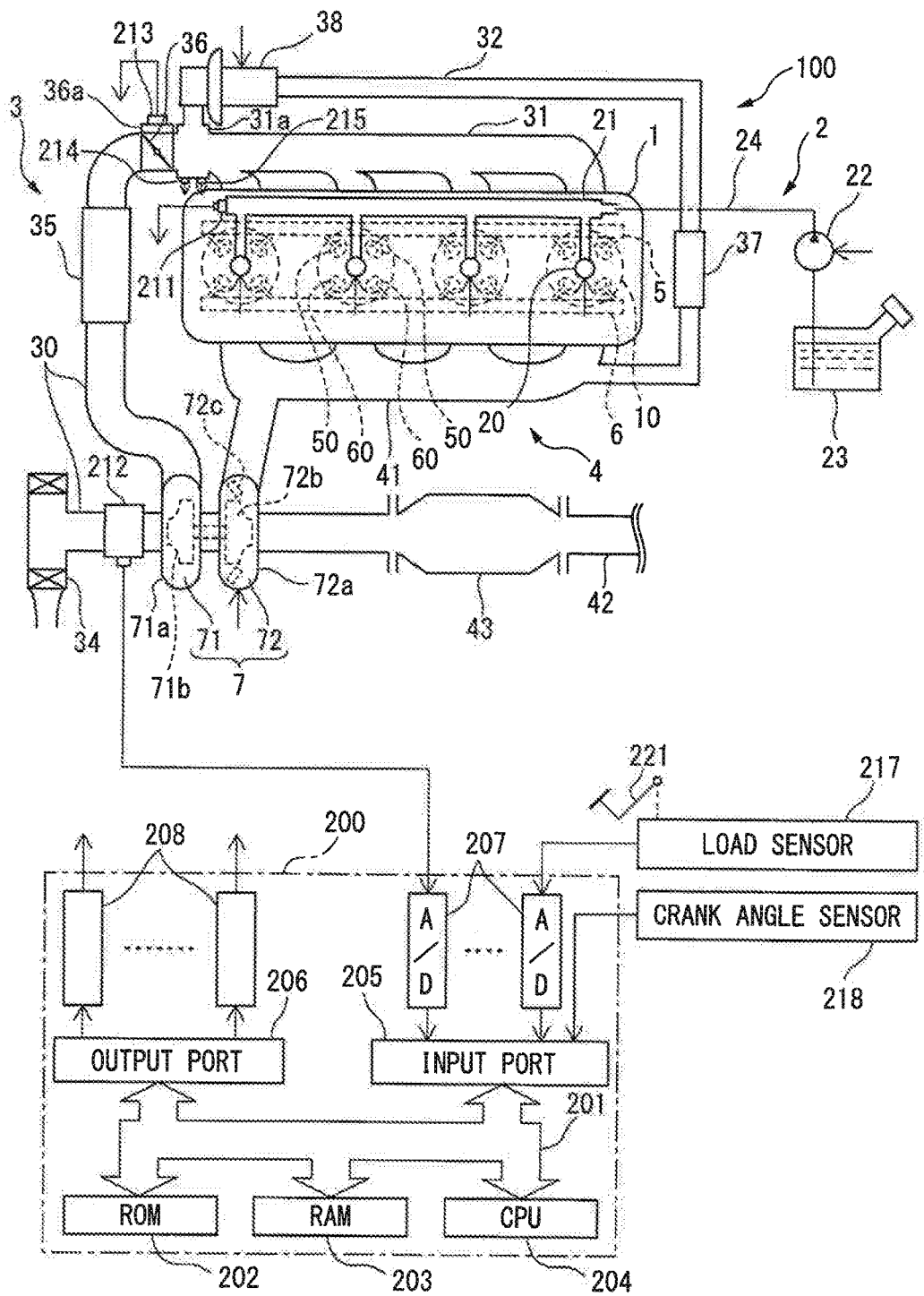
FIG. 1 is a schematic view of the configuration of an internal combustion engine and an electronic control unit for controlling the internal combustion engine according to an embodiment of the present disclosure.

Below, referring to the drawings, embodiments of the present invention will be explained in detail. Note that, in the following explanation, similar component elements are assigned the same reference notations.

Figure 2:
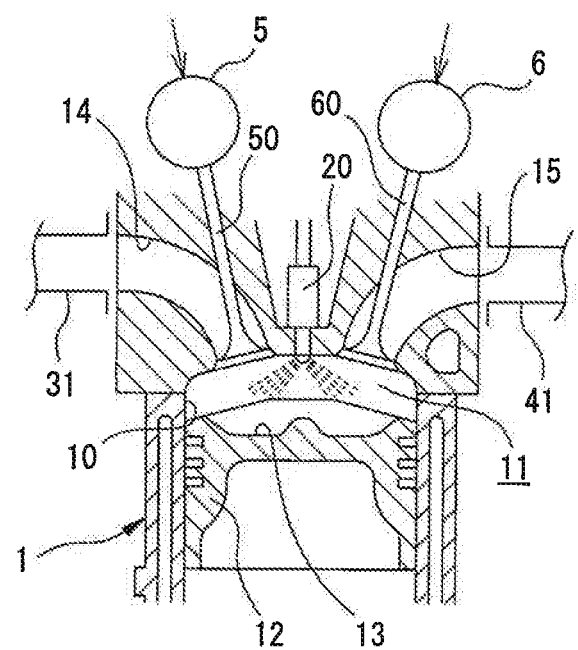
FIG. 2 is a cross-sectional view of an engine body of an internal combustion engine.

FIG. 1 is a schematic view of the configuration of an internal combustion engine 100 and an electronic control unit 200 for controlling the internal combustion engine 100 according to one embodiment of the present disclosure. FIG. 2 is a cross-sectional view of an engine body 1 of the internal combustion engine 100.

As shown in FIG. 1, the internal combustion engine 100 comprises an engine body 1 provided with a plurality of cylinders 10, a fuel feed system 2, an intake device 3, an exhaust device 4, an intake valve operating device 5, and an exhaust valve operating device 6.

The engine body 1 makes fuel burn in a combustion chamber 11 formed in each cylinder 10 (see FIG. 2) to generate power for driving for example a vehicle etc. The engine body 1 is provided with a pair of intake valves 50 and a pair of exhaust valves 60 for each cylinder.

The fuel feed system 2 is provided with electronic control type fuel injectors 20, a delivery pipe 21, supply pump 22, fuel tank 23, pressure pipe 24, and fuel pressure sensor 211.

Each fuel injector 20 is provided at the engine body 1 so as to be able to inject fuel toward a cavity 13 formed at a top surface of a piston 12 receiving combustion pressure and moving reciprocally inside a cylinder 10 and thereby form a stratified premixed gas. In the present embodiment, one fuel injector 20 is provided at each cylinder 10 so as to face the combustion chamber 11 of the cylinder 10. The opening time (injection amount) and opening timing (injection timing) of the fuel injector 20 are changed by control signals from the electronic control unit 200. If the fuel injector 20 is opened, fuel is directly injected from the fuel injector 20 into the combustion chamber 11.

The delivery pipe 21 is connected through a pumping pipe 24 to the fuel-tank 23. In the middle of the pumping pipe 24, a feed pump 22 is provided for pressurizing fuel stored in the fuel tank 23 and feeding it to the delivery pipe 21. The delivery pipe 21 temporarily stores the high pressure fuel pumped from the feed pump 22. If a fuel injector 20 is opened, the high pressure fuel stored in the delivery pipe 21 is directly injected from that fuel injector 20 to the inside of a combustion chamber 11.

The feed pump 22 is configured to be able to be changed in discharge amount. The discharge amount of the feed pump 22 is changed by a control signal from the electronic control unit 200. By controlling the discharge amount of the feed pump 22, the fuel pressure inside the delivery pipe 21, that is, the injection pressure of each fuel injector 20, is controlled.

A fuel pressure sensor 211 is provided at the delivery pipe 21. The fuel pressure sensor 211 detects the fuel pressure inside the delivery pipe 21, that is, the pressure of the fuel injected from the fuel injectors 20 to the cylinders 10 (injection pressure).

The intake device 3 is a device for guiding intake air to the inside of a combustion chamber 11 and is configured to be able to change the state of the intake air sucked into the combustion chamber 11 (intake pressure, intake temperature, amount of EGR (exhaust gas recirculation) gas). The intake system 3 is provided with an intake pipe 30 and intake manifold 31 forming an intake passage and an EGR passage 32.

The intake passage 30 is connected at one end to an air cleaner 34 and is connected at the other end to an intake collector 31a of the intake manifold 31. At the intake passage 30, in order from the upstream side, an air flowmeter 212, compressor 71 of the exhaust turbocharger 7, intercooler 35, and throttle valve 36 are provided.

The air flowmeter 212 detects the flow rate of air flowing through the inside of the intake passage 30 and finally being taken into a cylinder 10.

The compressor 71 comprises a compressor housing 71a and a compressor wheel 71b arranged inside the compressor housing 71a. The compressor wheel 71b is driven to rotate by a turbine wheel 72b of the exhaust turbocharger 7 attached on the same shaft and compresses and discharges intake air flowing into the compressor housing 71a. At the turbine 72 of the exhaust turbocharger 7, a variable nozzle 72c for controlling the rotational speed of the turbine wheel 72b is provided. By using the variable nozzle 72c to control the rotational speed of the turbine wheel 72b, the pressure of the intake air discharged from inside the compressor housing 71a (supercharging pressure) is controlled.

The intercooler 35 is a heat exchanger for cooling the intake air compressed by the compressor 71 and becoming a high temperature by, for example, running air or cooling water.

The throttle valve 36 changes the cross-sectional area of the passage of the intake pipe 30 to thereby adjust the amount of intake introduced into the intake manifold 31. The throttle valve 36 is driven to operate by a throttle actuator 36a. The throttle sensor 213 detects its opening degree (throttle opening degree).

The intake manifold 31 is connected to intake ports 14 formed in the engine body 1 and evenly distributes the intake flowing in from the intake pipe 30 through the intake ports 14 to the cylinders 10. The intake collector 31a of the intake manifold 31 is provided with an intake pressure sensor 214 for detecting the pressure of the intake air sucked into the cylinders (intake pressure) and an intake temperature sensor 215 for detecting the temperature of the intake air sucked into the cylinders (intake temperature).

The EGR passage 32 is a passage for connecting the exhaust manifold 41 and intake collector 31a of the intake manifold 31 and returning part of the exhaust discharged from each cylinder 10 to the intake collector 31a by the pressure difference. Below, the exhaust flowing into the EGR passage 32 will be called the "EGR gas", while the ratio of the amount of EGR gas in the amount of gas in a cylinder, that is, the rate of reflux of the exhaust, will be called the "EGR rate". By making the EGR gas flow back to the intake collector 31a and in turn the cylinders 10, it is possible to lower the combustion temperature and suppress the discharge of nitrogen oxides ($NO_X$). In the EGR passage 32, in order from the upstream side, an EGR cooler 37 and EGR valve 38 are provided.

The EGR cooler 37 is a heat exchanger for cooling the EGR gas by, for example, running air or cooling water.

The EGR valve 38 is a solenoid valve enabling continuous or stepwise adjustment of the opening degree. The opening degree is controlled by the electronic control unit 200 in accordance with the engine operating state. By controlling the opening degree of the EGR valve 38, the flow rate of the EGR gas recirculated to the intake collector 31a is adjusted.

The exhaust device 4 is a device for discharging exhaust from the cylinders and is comprised of an exhaust manifold 41 and exhaust passage 42.

The exhaust manifold 41 is connected to an exhaust port 15 formed at the engine body 1 and gathers together the exhaust discharged from the cylinders 10 for introduction into the exhaust passage 42.

In the exhaust passage 42, in order from the upstream side, the turbine 72 of the exhaust turbocharger 7 and an exhaust post-treatment device 43 are provided.

The turbine 72 is provided with a turbine housing 72a and a turbine wheel 72b arranged inside the turbine housing 72a. The turbine wheel 72b is driven to rotate by the energy of the exhaust flowing into the turbine housing 72a and drives a compressor wheel 71b attached on the same shaft.

At the outside of the turbine wheel 72b, the above-mentioned variable nozzle 72c is provided. The variable nozzle 72c functions as a throttle valve. The nozzle opening degree (valve opening degree) of the variable nozzle 72c is controlled by the electronic control unit 200. By changing the nozzle opening degree of the variable nozzle 72c, it is possible to change the flow rate of exhaust driving the turbine wheel 72b inside the turbine housing 72a. That is, by changing the nozzle opening degree of the variable nozzle 72c, it is possible to change the rotational speed of the turbine wheel 72b to change the supercharging pressure. Specifically, if reducing the nozzle opening degree of the variable nozzle 72c (throttling the variable nozzle 72c), the flow rate of the exhaust rises, the rotational speed of the turbine wheel 72b increases, and the supercharging pressure increases.

The exhaust post treatment device 43 is a device for cleaning the exhaust, then discharging it into the outside air and is provided with various types of exhaust purification catalysts for removing harmful substances, filters for trapping harmful substances, etc.

The intake valve operating device 5 is a device for driving the intake valves 50 of the cylinders 10 to open and close and is provided at the engine body 1. The intake valve operating device 5 according to the present embodiment is configured to use for example an electromagnetic actuator to drive the intake valves 50 to open and close so as to enable control of the opening and closing timings of the intake valves 50. However, the disclosure is not limited to this. It is also possible to configure it to use an intake cam shaft to drive the intake valves 50 to open and close and provide a variable valve operating device for changing the relative phase angle of the intake cam shaft to the crankshaft by hydraulic control of one end of the intake cam shaft to thereby enable control of the opening/closing timings of the intake valves 50.

The exhaust valve operating device 6 is a device for driving operation of the exhaust valve 60 of each cylinder 10 and is provided at the engine body 1. The exhaust valve operating device 6 according to the present embodiment is configured so as to make the exhaust valve 60 of the each cylinder 10 open during the exhaust stroke and to enable opening even during the intake stroke in accordance with need. In the present embodiment, as such an exhaust valve operating device 6, an electromagnetic actuator controlled by the electronic control unit 200 is employed. By driving operation of the exhaust valve 60 of each cylinder 10 by an electromagnetic actuator, the operating timing and lift of the exhaust valve 60 are controlled to any timing and lift. Note that, the exhaust valve operating device 6 is not limited to an electromagnetic actuator. For example, it is also possible to employ a valve operating device changing the operating time or lift of an exhaust valve 60 by changing the cam profile by oil pressure etc.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

The input port 205 receives as input the output signals of the above-mentioned fuel pressure sensor 211 etc. through the corresponding AD converters 207. Further, the input port 205 receives as input, as a signal for detecting the engine load, the output voltage of a load sensor 217 generating an output voltage proportional to the amount of depression of the accelerator pedal 220 (below, referred to as "the amount of accelerator depression") through the corresponding AD converter 207. Further, the input port 205 receives as input, as a signal for calculating the engine rotational speed etc., the output signal of a crank angle sensor 218 generating an output pulse each time the crankshaft of the engine body 1 rotates for example by 15°. In this way, the input port 205 receives as input the output signals of various types of sensors required for control of the internal combustion engine 100.

The output port 206 is connected to the fuel injectors 20 and other controlled parts through the corresponding drive circuits 208.

The electronic control unit 200 outputs control signals for controlling the various controlled parts from the output port 206 to control the internal combustion engine 100 based on the output signals of the various types of sensors input to the input port 205. Below, the control of the internal combustion engine 100 performed by the electronic control unit 200 will be explained.

The electronic control unit 200 operates the engine body 1 by switching the operating mode of the engine body 1 to the premix charged compressive ignition mode (below, referred to as the "PCCI" mode) or diffusive combustion mode (below, referred to as the "DC mode") based on the engine operating state (engine rotational speed and engine load).

Figure 3:
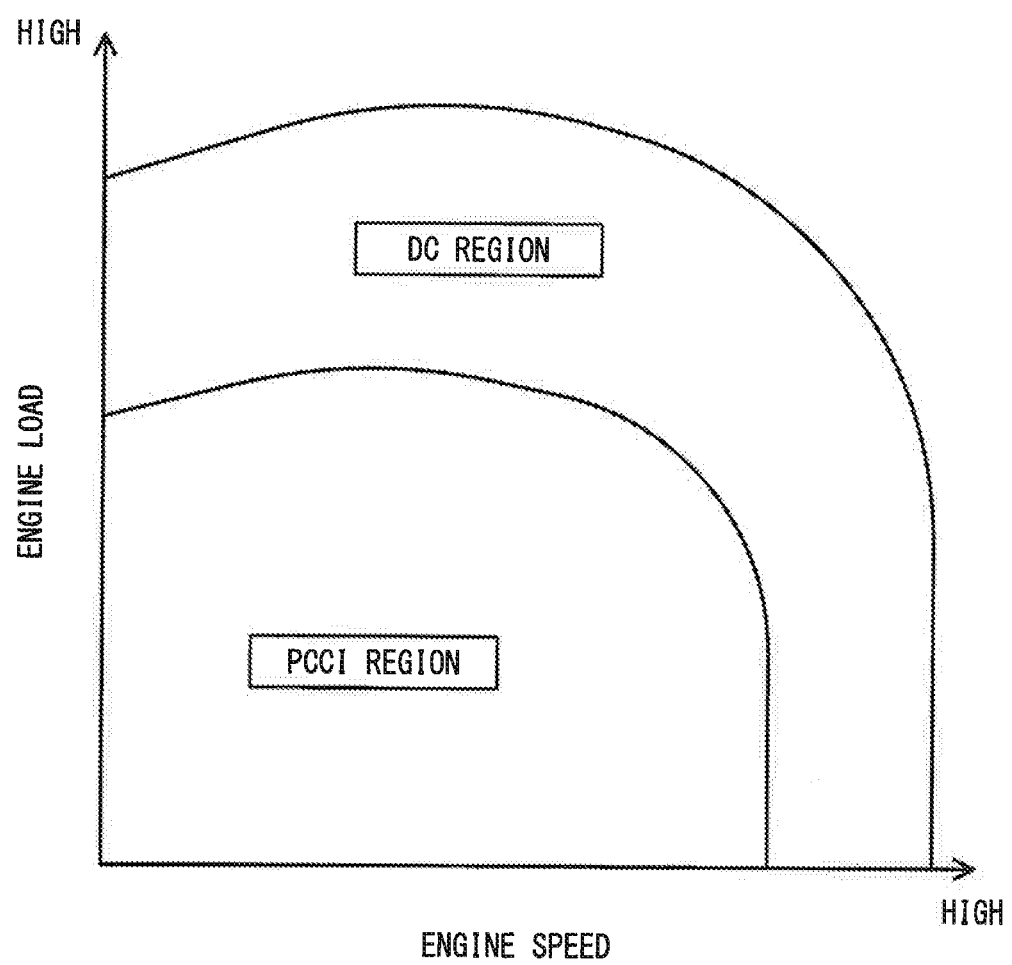
FIG. 3 is a view showing operating regions of the engine body.

The electronic control unit 200, as shown in FIG. 3, switches the operating mode to the PCCI mode if the engine operating state is the low speed, low load side PCCI region and switches the operating mode to the DC mode if the engine operating state is the high speed, high load side DC region. Further, the electronic control unit 200 operates the engine body 1 by controlling the various devices such as the fuel feed system 2 and intake device 3 in accordance with the operating mode.

Specifically, the electronic control unit 200 operates the engine body 1 by controlling the various devices so that when the operating mode is the DC mode, the fuel injected into a combustion chamber 11 basically burns with a short ignition delay time (time from when fuel is injected into the combustion chamber 11 to when the fuel self-ignites) with substantially no delay after fuel injection as diffusive combustion.

Further, the electronic control unit 200 operates the engine body 1 by controlling the various devices so that when the operating mode is the PCCI mode, the fuel injected into a combustion chamber 11 basically burns after a certain premixing time with the air after fuel injection (that is, ignition delay time longer than the time of diffusive combustion after fuel injection) as premix charged compressive ignition.

In this way, diffusive combustion is a mode of combustion with a short premix type of fuel and air after fuel injection compared with premix charged compressive ignition, so the ratio of combustion of an air-fuel mixture greater in fuel concentration in a combustion chamber 11 (that is, air-fuel mixture with large equivalent ratio $\phi$) tends to increase. If an air-fuel mixture with a high fuel concentration burns in the combustion chamber 11, the shortage of oxygen results in soot being produced and causing smoke.

As opposed to this, premix charged compressive ignition is a combustion mode providing a certain time period for premixing fuel and air after fuel injection and burning the premix. Compared with when performing diffusive combustion, it is possible to reduce the ratio of combustion of an air-fuel mixture with a high fuel concentration in a combustion chamber 11. For this reason, by performing premix charged compressive ignition like in the present embodiment in an operating region enabling both premix charged compressive ignition and diffusive combustion, the production of soot can be suppressed, so the exhaust emission can be improved.

However, in premix charged compressive ignition, the premixes self-ignite at the same timing in a combustion chamber 11, so there is the problem that the combustion noise (dB) increases compared with diffusive combustion where fuel injected into a combustion chamber 11 sequentially burns substantially without delay after fuel injection.

Figure 4:
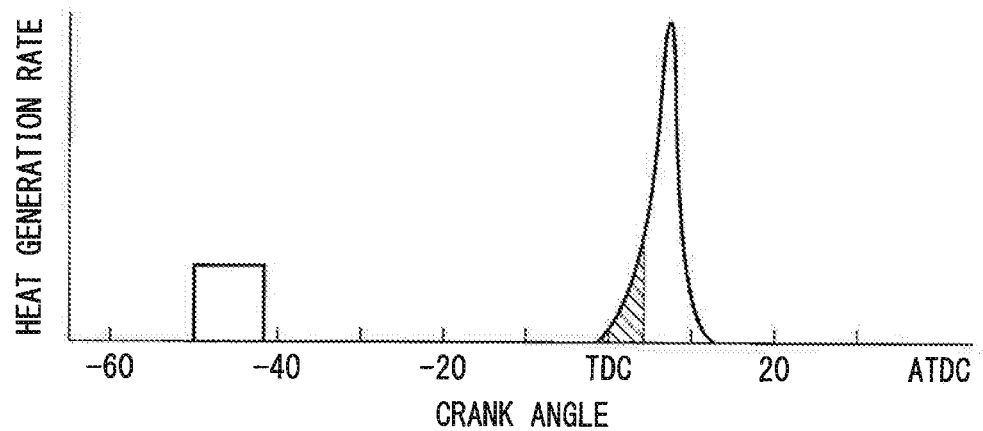
FIG. 4 is a view showing a relationship between a crank angle and heat generation rate when injecting fuel at any time in a compression stroke from a fuel injector only once to perform compressive ignition.

FIG. 4 is a view showing the relationship between a crank angle and heat generation rate when performing compressive ignition by injecting fuel from the fuel injector 20 just once at any timing in the compression stroke. The "heat generation rate $(dQ/d\theta)$ [J/° CA]" is the amount of heat per unit crank angle generated by burning the fuel, that is, the amount Q of heat generated per unit crank angle. Note that in the following explanation, the combustion waveform showing the relationship of the crank angle and heat generation rate will be referred to as the "heat generation rate pattern" according to need.

Figure 5:
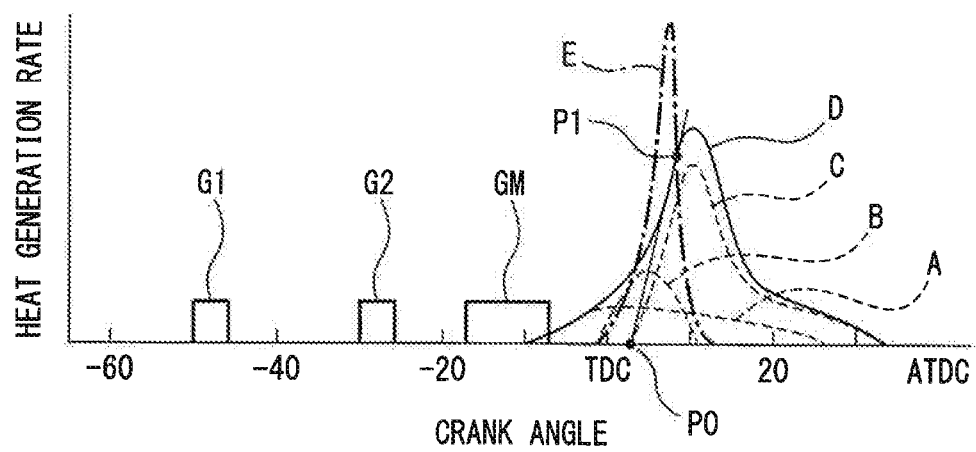
FIG. 5 is a view showing a relationship between a crank angle and heat generation rate when performing combustion control at the time of a PCCI mode according to an embodiment of the present disclosure.

As explained above, when making premixes burn by compressive ignition, the premixes self-ignite at the same timing, so the combustion speed becomes faster and the combustion period becomes shorter than when burning them by diffusive combustion. For this reason, as shown in FIG. 5, when burning premixes by compressive ignition, the peak value of the heat generation rate pattern and the slant $(d^2Q/(d\theta)^2)$ at the start of combustion in the heat generation rate pattern (region shown by hatching in FIG. 4) tend to become relatively large.

The combustion noise D is correlated with the peak value and the slant at the start of combustion of this heat generation rate pattern. The larger the peak value of the heat generation rate pattern and, further, the larger the slant at the start of combustion, the larger the noise becomes. For this reason, when performing premix charged compressive ignition, the combustion noise D increases compared with when performing diffusive combustion.

Furthermore, premix charged compressive ignition has the problem that it is difficult to control the self-ignition timing to the target self-ignition timing compared with when performing diffusive combustion. If the self-ignition timing deviates from the target self-ignition timing, various problems arise.

For example, if the self-ignition timing becomes advanced from the target self-ignition timing, the premixes burn by self-ignition by a crank angle in the expansion stroke at the advanced side closer to compression top dead center than usual, that is, a crank angle higher in cylinder pressure P and cylinder temperature T than usual. For this reason, the combustion becomes more vigorous than usual, the combustion speed increases, and as a result the problem arises that the peak value and slant at the start of combustion of the heat generation rate become greater than usual and the combustion noise increases from usual. Further, if the self-ignition timing becomes delayed from the target self-ignition timing, conversely the combustion becomes slower and the combustion ends up with a low constant volume degree. As a result, the problem arises that the output falls and torque fluctuation occurs.

Therefore, when the operating mode is the PCCI mode, it is necessary to make the heat generation rate pattern when performing premix charged compressive ignition a heat generation rate pattern with a smaller combustion noise while controlling the self-ignition timing precisely to the target self-ignition timing.

Therefore, in the present embodiment, when the operating mode is the PCCI mode, fuel is injected divided to cause a plurality of compressive ignitions in stages with a time difference so as to make the heat generation rate pattern when performing the premix charged compressive ignition a heat generation rate pattern where the combustion noise becomes smaller and precisely control the self-ignition timing to the target self-ignition timing. Specifically, at least two auxiliary fuel injections of a first pre-injection G1 and second pre-injection G2 are performed before a main injection GM as main fuel injection mainly for causing the generation of the required torque.

Below, referring to FIG. 5, combustion control at the time of the PCCI mode according to this embodiment will be explained.

FIG. 5 is a view showing the relationship between the crank angle and heat generation rate when controlling combustion at the time of the PCCI mode according to the present embodiment. Specifically, it is a view showing the relationship between the crank angle and heat generation rate when sequentially performing the first pre-injection G1, second pre-injection G2, and main injection GM from the fuel injector 20 without changing the total of the fuel injection amounts compared with the case of FIG. 4 and causing compressive ignition three times in stages with provision of a time difference.

In FIG. 5, the heat generation rate pattern A is the heat generation rate pattern when a premix formed by mainly the first pre-injection G1 is burned by compressive ignition. The heat generation rate pattern B is the heat generation rate pattern when a premix formed by mainly the second pre-injection G2 is burned by compressive ignition. The heat generation rate pattern C is the heat generation rate pattern when a premix formed by mainly the main injection GM is burned by compressive ignition. The heat generation rate pattern D is the actual heat generation rate pattern combining the heat generation rate pattern A, heat generation rate pattern B, and heat generation rate pattern C. The heat generation rate pattern E is the heat generation rate pattern of FIG. 4 shown for comparison.

Note that, in the present embodiment, as shown in FIG. 5, the crank angle where the tangent at the location where the slant of the heat generation rate pattern D becomes maximum (in the example of FIG. 5, the point P1) and the abscissa (in the example of FIG. 5, the point P0) is defined as the self-ignition timing of the premix formed by the main injection GM (below, referred to as the "main self-ignition timing"). The target injection timing of the main injection is set based on the engine operating state so that the main self-ignition timing becomes the target main self-ignition timing. Note that, in the present embodiment, experiments etc. are run in advance to set the target main self-ignition timing so that the constant volume degree becomes a predetermined value or more.

Further, as shown in FIG. 5, in the present embodiment, the target injection amounts and target injection timings of the first pre-injection G1 and second pre-injection G2 are set so that no clear heat generation is caused before the start of the main injection GM. In other words, the target injection amounts and target injection timings of the first pre-injection G1 and second pre-injection G2 are set so that the premixes formed by the first pre-injection G1 and the second pre-injection G2 do not burn before the start of the main injection GM.

This is so as to keep fuel from ending up burning by diffusive combustion before premixing the fuel injected by the main injection GM since the cylinder temperature ends up rising due to the heat of combustion if the premixes formed by the first pre-injection G1 and second pre-injection G2 end up burning before the start of the main injection G3.

Further, in the present embodiment, the target injection amounts and target injection timings of the first pre-injection G1 and the second pre-injection G2 are set so that at least after the main injection GM is started, the premix formed by the first pre-injection G1 first self-ignites, then the premix formed by the second pre-injection G2 self-ignites, and finally the premix formed by the main injection GM self-ignites. In other words, the target injection amounts and target injection timings of the first pre-injection G1 and the second pre-injection G2 are set so that the premixes formed by the injections start to burn by compressive ignition in stages.

By dividing the fuel for injection and making the premixes formed by the different injections self-ignite in stages, it is possible to offset the crank angles of the peak values of the heat generation rate patterns A, B, and C. Further, both in the case of FIG. 4 and the case of FIG. 5, the total of the fuel injection amounts does not change, so the amounts of fuel contributing to the formation of the heat generation rate patterns A, B, and C become smaller than the amount of fuel contributing to the formation of the heat generation rate pattern E. For this reason, the peak values of the heat generation rate patterns A, B, and C become smaller than the peak value of the heat generation rate pattern E.

As a result, the peak value of the actual combustion waveform combining the heat generation rate pattern A, heat generation rate pattern B, and heat generation rate pattern C, that is, the heat generation rate pattern D, can be lowered from the peak value of the heat generation rate pattern E and a heat generation rate pattern with smaller combustion noise can be formed.

Further, in the present embodiment, the first pre-injection G1 and the second pre-injection G2 can be performed by the following such technical idea so as to form a heat generation rate pattern with a further smaller combustion noise and the main self-ignition timing can be precisely controlled to the target main self-ignition timing. Below, details of the first pre-injection G1 and second pre-injection G2 will be explained.

The first pre-injection G1 is injection performed for reducing the combustion noise when performing premix charged compressive ignition.

For this reason, in the present embodiment, the target injection amount A1 and target injection timing W1 of the first pre-injection G1 are set so that the peak value and slant at the start of combustion in the heat generation rate pattern A when the premix formed by the first pre-injection G1 burns by compressive ignition become smaller than the peak values and slants at the start of combustion of the heat generation rate patterns B and C when the premixes formed by the second pre-injection G2 and main injection GM burn by compressive ignition. Specifically, the target injection amount A1 and target injection timing W1 of the first pre-injection G1 are set so that the premix formed by the first pre-injection G1 first burns by compressive ignition after becoming a lean premix with an equivalent ratio $\phi$ of less than about 1.

When making a premix burn by compressive ignition, the smaller the equivalent ratio $\phi$ of the premix, the slower the combustion speed, so the longer the combustion period and the smaller the peak value and slant at the start of combustion of the heat generation rate pattern. For this reason, by setting the target injection amount A1 and target injection timing W1 of the first pre-injection G1 so that the premix formed by the first pre-injection G1 first burns by compressive ignition after the premix becomes a lean premix with an equivalent ratio $\phi$ of roughly less than 1, as shown in FIG. 5, it is possible to reduce the peak value and slant at the start of combustion of the heat generation rate pattern A. As a result, it is possible to reduce the slant at the start of combustion of the heat generation rate pattern D, so it is possible to further reduce the combustion noise.

Here, the value of the equivalent ratio $\phi$ of the premix formed by the fuel injected from the fuel injector 20, if the fuel injection amount is the same, basically depends on elapsed time from when fuel is injected regardless of the engine operating state. That is, the value of the equivalent ratio $\phi$ of the premix formed by the fuel injected from the fuel injector 20, if the fuel injection amount is the same, basically becomes a value corresponding to the elapsed time from when fuel is injected regardless of the engine operating state. The longer the elapsed time from injection of fuel, the more the fuel is dispersed along with the elapse of time, so the smaller the value becomes.

Therefore, if setting the time from when the first pre-injection G1 is performed to when the premix formed by the first pre-injection G1 burns by compressive ignition to a predetermined time or more corresponding to the target injection amount A1 of the first pre-injection G1, it is possible to make the premix formed by the first pre-injection G1 a lean premix with an equivalent ratio $\phi$ of roughly less than 1.

Therefore, in the present embodiment, the target injection timing W1 of the first pre-injection G1 is set based on target injection amount A1 of the first pre-injection G1 and the engine rotational speed so that the time from the first pre-injection G1 to the target main self-ignition timing becomes a first premixing time determined corresponding to the target injection amount A1 of the first pre-injection G1 based on the target main self-ignition timing. Due to this, the premix formed by the first pre-injection G1 first burns by compressive ignition after the premix becomes a lean premix with an equivalent ratio $\phi$ of roughly less than 1.

The second pre-injection G2 is injection performed for precisely controlling the main self-ignition timing to the target main self-ignition timing. For this reason, in the present embodiment, the target injection amount A2 and target injection timing W2 of the second pre-injection G2 are set so that the premix formed by the second pre-injection G2 ignites after the premix formed by the first pre-injection G1 starts to self-ignite and before the premix formed by the main injection GM.

Due to this, it is possible to use the heat of combustion when making the premix formed by the second pre-injection G2 burn to forcibly make the cylinder temperature rise and promote the self-ignition of the premix formed by the main injection GM. That is, in the present embodiment, to stabilize the self-ignition timing of the premix formed by the main injection GM (main self-ignition timing), the second pre-injection G2 is performed so that it self-ignites before the premix formed by the main injection GM and the heat of combustion when burning the premix formed by the second pre-injection G2 is used to cause compressive ignition of the premix formed by the main injection GM.

Therefore, to precisely control the main self-ignition timing to the target main self-ignition timing, it is necessary to suppress variation in the self-ignition timing of the premix formed by the second pre-injection G2.

Therefore, in the present embodiment, further, the target injection amount A2 and target injection timing W2 of the second pre-injection G2 are set so that the premix formed by the second pre-injection G2 self-ignites when becoming a rich premix with an equivalent ratio $\phi$ of roughly 1 to 2 or so. Below, the reasons will be explained.

In a transient state from when the engine load fluctuates to when it becomes a steady state, supercharging delay, delay in EGR gas, etc. cause the oxygen concentration in a combustion chamber 11 to change compared with the steady state.

Figure 6:
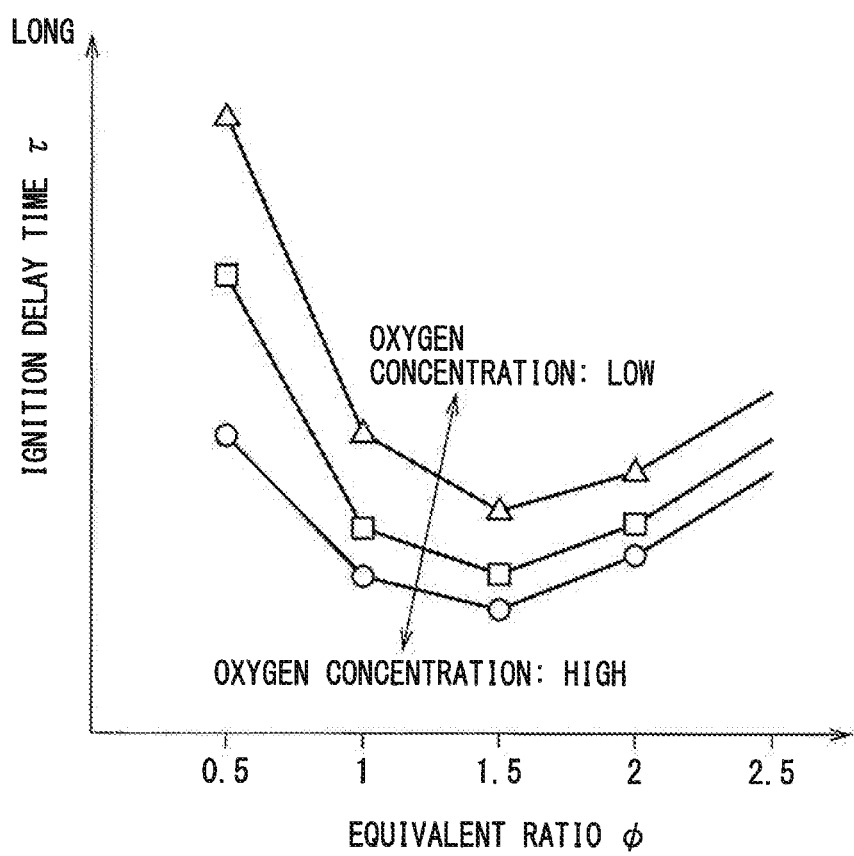
FIG. 6 is a view showing a relationship between an equivalent ratio $\phi$ and an ignition delay time $\tau$ in accordance with an oxygen concentration in a combustion chamber.

FIG. 6 is a view showing the relationship between the equivalent ratio $\phi$ and the ignition delay time $\tau$ in accordance with the oxygen concentration in a combustion chamber 11.

As shown in FIG. 6, the ignition delay time $\tau$, regardless of the level of the oxygen concentration, becomes the shortest when the equivalent ratio $\phi$ of the premix is about 1.5. Further, the ignition delay time $\tau$ increases in length as the equivalent ratio $\phi$ becomes smaller than 1.5 and greatly increases in length if the equivalent ratio $\phi$ becomes smaller than 1 since the premix becomes lean and harder to ignite. Further, if the equivalent ratio $\phi$ becomes smaller than 1, the ignition delay time $\tau$ greatly changes due to differences in the oxygen concentration.

The longer the ignition delay time $\tau$ becomes, the more the self-ignition timing of the premix varies and the more difficult it becomes to stabilize the self-ignition timing. Further, if the equivalent ratio $\phi$ becomes smaller than 1, the ignition delay time $\tau$ greatly changes due to differences in the oxygen concentration, so at the time of a transient state, the self-ignition timing varies and it becomes even more difficult to stabilize the self-ignition timing.

Further, as shown in FIG. 6, the ignition delay time $\tau$ becomes longer since even if the equivalent ratio $\phi$ becomes larger than 1.5, the cylinder temperature easily falls due to the latent heat of evaporation of fuel, so the premix becomes harder to self-ignite. On the other hand, if the equivalent ratio $\phi$ is larger than 1.5, there is little change of the ignition delay time $\tau$ due to the differences in oxygen concentration.

Further, as will be understood from FIG. 6, if the equivalent ratio ϕ of the premix is roughly 1 to 2, the ignition delay time τ becomes relatively short and there is also little change in the ignition delay time τ due to differences in the oxygen concentration.

Therefore, by using the second pre-injection G2 to form a premix with an equivalent ratio ϕ of roughly 1 to 2 or so and making this premix self-ignite before the premix formed by the main injection GM, not only at the time of a steady state, but also the time of a transient state, it is possible to stabilize the self-ignition timing of the premix formed by the second pre-injection G2. As a result, it is possible to stabilize the self-ignition timing of the premix formed by the main injection GM, so it is possible to precisely control the main self-ignition timing to the target main self-ignition timing.

Here, as explained above, the value of the equivalent ratio ϕ of the premix formed by fuel injected from the fuel injector 20, if the fuel injection amount is the same, basically depends on the elapsed time from when injecting fuel regardless of the engine operating state. Therefore, if making the time from when performing the second pre-injection G2 to when the premix formed by the second pre-injection G2 burns by compressive ignition within a certain time corresponding to the target injection amount of the second pre-injection G2, it is possible to make the premix formed by the second pre-injection G2 a premix with an equivalent ratio ϕ of roughly 1 to 2 or so.

Therefore, in the present embodiment, the target injection timing W2 of the second pre-injection G2 is set based on the target injection amount A2 of the second pre-injection G1 and the engine rotational speed so that the time from the second pre-injection G1 to the target main self-ignition timing becomes a second premixing time determined corresponding to the target injection amount A2 of the second pre-injection G2 (<first premixing time) based on the target main self-ignition timing. Due to this, self-ignition is caused after the premix formed by the second pre-injection G2 becomes a premix with an equivalent ratio ϕ of roughly 1 to 2 or so.

Note that, the second pre-injection G2 is performed in the state where the the cylinder temperature T and cylinder pressure P are higher than the first pre-injection G1. The premix formed by the second pre-injection G2 is a premix richer than the premix formed by the first pre-injection G1. For this reason, the ignition delay time τ of the premix formed by the second pre-injection G2 tends to become shorter compared with the ignition delay time τ of the premix formed by the first pre-injection G1.

Therefore, when making the rich premix formed by the second pre-injection G2 burn by self-ignition after performing the main injection GM and after the premix formed by the first pre-injection G1 as well, the injection timing of the second pre-injection G2 definitely has to be made to approach the injection timing of the main injection GM.

On the other hand, the first pre-injection G1 is performed in the state where the cylinder temperature T and cylinder pressure P are low. Further, the premix formed by the first pre-injection G2 is a lean premix. For this reason, the ignition delay time T of the premix formed by the first pre-injection G1 tends to conversely become longer compared with the ignition delay time s of the premix formed by the second pre-injection G2. Therefore, when making the premix formed by the first pre-injection G1 first burn by self-ignition after performing the main injection GM, the injection timing of the second pre-injection G1 definitely must be made far from the injection timing of the main injection GM.

Therefore, when like in the present embodiment injecting the fuel divided to make the premixes formed by the different injections burn by self-ignition in stages after performing the main injection GM, as shown in FIG. 5, the crank interval from the first pre-injection G1 to the second injection G2 becomes larger than the crank interval from the second injection G2 to the main injection GM.

Figure 7:
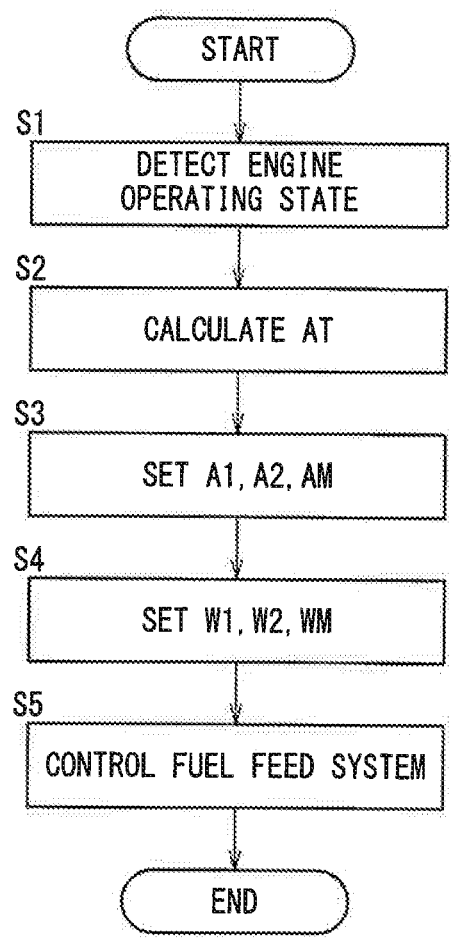
FIG. 7 is a flow chart explaining fuel injection control in the PCCI mode according to an embodiment of the present disclosure.

FIG. 7 is a flow chart explaining the fuel injection control at the time of the PCCI mode according to the present embodiment. The electronic control unit 200 repeatedly performs the present routine by a predetermined processing period (for example, 10 ms) when the operating mode is set to the PCCI mode.

At step S1, the electronic control unit 200 reads the engine rotational speed calculated based on the output signal of the crank angle sensor 218 and the engine load detected by the load sensor 217 and detects the engine operating state.

At step S2, the electronic control unit 200 refers to a table prepared in advance by experiments etc. and calculates the overall fuel injection amount AT based on the engine load. The overall fuel injection amount AT becomes larger the higher the engine load.

At step S3, the electronic control unit 200 sets the target injection amounts of the first pre-injection G1, second pre-injection G2, and main injection GM. In the present embodiment, the electronic control unit 200 sets the target injection amount of the main injection GM at a preset predetermined target injection amount AM regardless of the engine load. Further, the electronic control unit 200 divides the remaining injection amount A0, obtained by subtracting the target injection amount AM of the main injection GM from the overall fuel injection amount AT, between the target injection amount A1 of the first pre-injection G1 and the target injection amount A2 of the second pre-injection G2.

At this time, in the present embodiment, the electronic control unit 200 divides the remaining injection amount A0, obtained by subtracting the target injection amount AM of the main injection GM from the overall fuel injection amount AT, by a distribution rate corresponding to the engine load to set the target injection amount A1 of the first pre-injection G1 and the target injection amount A2 of the second pre-injection G2. Specifically, the electronic control unit 200 divides the injection amount A0 between the target injection amount A1 and the target injection amount A2 so that the ratio of the target injection amount A1 with respect to the injection amount A0 becomes higher than the ratio of the target injection amount A2 with respect to the injection amount A0 the higher the engine load so as to calculate the target injection amount A1 of the first pre-injection G1 and the target injection amount A2 of the second pre-injection G2.

That is, in the present embodiment, when the engine load becomes higher and the overall fuel injection amount AT and in turn the injection amount A0 increases, the ratio of increase of the target injection amount A1 of the first pre-injection G1 is made larger than the ratio of increase of the target injection amount A2 of the second pre-injection G2. In this way, when the engine load becomes high and the overall fuel injection amount AT increases, by increasing the ratio of increase of the target injection amount A1 of the first pre-injection G1 contributing to the formation of the heat generation rate pattern A with the smallest peak value of the heat generation rate pattern, it is possible to suppress the increase in the peak value of the actual combustion waveform of the heat generation rate pattern D. For this reason, it is possible to further suppress combustion noise when the engine load becomes high and the overall fuel injection amount AT increases.

At step S4, the electronic control unit 200 sets the target injection timings of the first pre-injection G1, second pre-injection G2, and main injection GM.

In the present embodiment, the electronic control unit 200 refers to a map prepared in advance and sets the target injection timing WM of the main injection GM based on the engine operating state so that the main self-ignition timing becomes the target main self-ignition timing.

On the other hand, the electronic control unit 200 sets the target injection timing W1 of the first pre-injection G1 and target injection timing W2 of the second pre-injection G2 as follows:

To make the premix formed by the first pre-injection G1 self-ignite after being made a lean premix with an equivalent ratio φ of roughly less than 1, a certain time corresponding to the target injection amount A1 becomes necessary after the first pre-injection G1 is performed. This certain time becomes longer the greater the target injection amount A1. Further, to secure the certain time for the premixing, the higher the engine rotational speed, the more to the advanced side the first pre-injection G1 must be performed compared with when it is low. Therefore, the electronic control unit 200 according to the present embodiment sets the target injection timing W1 of the first pre-injection G1 based on the target injection amount A1 of the first pre-injection G1 and the engine rotational speed so that the time from the first pre-injection G1 to the target main self-ignition timing becomes a predetermined first premixing time or more corresponding to the target injection amount A1. The first premixing time becomes longer the greater the target injection amount A1.

Further, for the second pre-injection G2 as well, in the same way, to make the premix formed by the second pre-injection G2 self-ignite when a rich premix of an equivalent ratio φ of roughly 1 to 2 or so, the time after performing the second pre-injection G2 to when the premix formed by the second pre-injection G2 burns by compressive ignition has to be made within the range of a certain time corresponding to the target injection amount of the second pre-injection G2. That certain time becomes longer the greater the target injection amount A2. Further, to secure that certain time, the higher the engine rotational speed, the more to the advanced side the second pre-injection G2 must be performed compared to when it is low. Therefore, the electronic control unit 200 according to the present embodiment sets the target injection timing W2 of the second pre-injection G2 based on the target injection amount A2 of the second pre-injection G2 and engine rotational speed so that the time from the second pre-injection G2 to the target main self-ignition timing becomes a predetermined second premixing time corresponding to the target injection amount A2. Note that the second premixing time becomes a time shorter than the first premixing time.

At step S5, the electronic control unit 200 controls the fuel feed system 2 so that the target injection amount A1 of fuel is injected at the target injection timing W1 of the first pre-injection G1. Further, the electronic control unit 200 controls the fuel feed system 2 so that the target injection amount A2 of fuel is injected at the target injection timing W2 of the second pre-injection G2. Still further, the electronic control unit 200 controls the fuel feed system 2 so that the target injection amount AM of fuel is injected at the target injection timing WM of the main pre-injection GM.

According to the present embodiment explained above, there is provided an electronic control unit 200 (control device) for controlling an internal combustion engine 100 provided with an engine body 1 and fuel injectors injecting fuel into combustion chambers 11 of the engine body 1. This is provided with a combustion control part sequentially injecting from a fuel injector at least primary auxiliary fuel (fuel injected by first pre-injection G1), secondary auxiliary fuel (fuel injected by second pre-injection G2), and main fuel (fuel injected by main injection GM) in predetermined operating regions, sequentially causing compressive ignition from the premix containing the primary auxiliary fuel after injecting the main fuel, and causing compressive ignition of the premix containing the main fuel using the heat generated when making the premix containing the secondary auxiliary fuel burn by compressive ignition.

Further, the combustion control part is configured to set the target injection amount A1 and target injection timing W1 of the primary auxiliary fuel so that the peak value and slant at the start of combustion of the heat generation rate pattern A formed by the premix containing the primary auxiliary fuel is smaller than the peak values and slants at the start of combustion of the heat generation rate patterns B and C formed by the premixes containing the secondary auxiliary fuel and main fuel. Specifically, the combustion control part is configured to set the target injection amount and target injection timing of the primary auxiliary fuel so that the premix containing the primary auxiliary fuel first burns by compressive ignition after becoming a premix with an equivalent ratio of less than 1.

In this way, by making the peak value and slant at the start of combustion of the heat generation rate pattern A formed by the premix containing the primary auxiliary fuel which first burns by compressive ignition the smallest, it is possible to reduce the slant at the start of combustion of the actual combustion waveform of the heat generation rate pattern D combining the heat generation rate pattern A, heat generation rate pattern B, and heat generation rate pattern C. Therefore, the combustion noise can be reduced.

Further, by making the premix containing the primary auxiliary fuel first burn by compressive ignition after becoming a premix with an equivalent ratio of less than 1, the following effects are also exhibited. That is, an air-fuel mixture with an equivalent ratio of less than 1 varies in self-ignition timing due to differences in the oxygen concentration, but primary auxiliary fuel is fuel contributing to the formation of a heat generation rate pattern A with the smallest peak value of the heat generation rate pattern, so even if the self-ignition timing varies and the peak value and slant at the start of combustion of the heat generation rate pattern A becomes larger, it is possible to suppress any change in the peak value of the actual combustion waveform of the heat generation rate pattern D. Therefore, it is possible to suppress an increase in the combustion noise at the time of a transient state.

Further the combustion control part according to the present embodiment is configured to be further provided with a first auxiliary fuel injection timing setting part setting the target injection timing W1 of the primary auxiliary fuel based on the target injection amount A1 and engine rotational speed of the primary auxiliary fuel so that the time from the target injection timing W1 of the primary auxiliary fuel to the self-ignition timing of the main fuel becomes the first premixing time corresponding to the target injection amount A1 of the primary auxiliary fuel regardless of the engine rotational speed. Further, the combustion control part is further provided with an overall fuel injection amount setting part setting an overall fuel injection amount AT based on the engine load and a distribution part distributing a remaining injection amount A0, obtained by subtracting the preset target injection amount Am of the main fuel from the overall fuel injection amount AT, between the target injection amount A1 of the primary auxiliary fuel and the target injection amount A2 of the secondary auxiliary fuel. The overall fuel injection amount setting part increases the overall fuel injection amount AT when the engine load is high compared to when it is low, while the distribution part is configured to raise the ratio of target injection amount A1 of the primary auxiliary fuel with respect to the remaining fuel amount A0 when the engine load is high compared with when it is low.

Due to this, when the engine load becomes high and the overall fuel injection amount AT increases, it is possible to suppress an increase of the peak value of the actual combustion waveform of the heat generation rate pattern D by increasing the ratio of increase of the target injection amount A1 of the first pre-injection G1 (target injection amount A1 of primary auxiliary fuel) contributing to the formation of the heat generation rate pattern A with the smallest peak value of the heat generation rate pattern. For this reason, it is possible to further suppress combustion noise when the engine load becomes higher and the overall fuel injection amount AT increases.

Further, the combustion control part according to the present embodiment is configured to set the target injection amount A2 and target injection timing W2 of the secondary auxiliary fuel so that the premix containing the secondary auxiliary fuel burns by compressive ignition when equivalent ratio of the premix containing the secondary auxiliary fuel is 1 to 2 after the premix containing the primary auxiliary fuel starts to burn by compressive ignition. Specifically, the combustion control part is configured to be further provided with a second auxiliary fuel injection timing setting part setting a target injection timing W2 of the secondary auxiliary fuel based on the target injection amount A2 of the secondary auxiliary fuel and engine rotational speed so that regardless of the engine rotational speed, the time from the target injection timing W2 of the secondary auxiliary fuel to the self-ignition timing of the main fuel becomes a predetermined second premixing time shorter than the first premixing time.

In this way, by using the second pre-injection G2 to form a premix with an equivalent ratio $\phi$ of roughly 1 to 2 or so and making this premix self-ignite before the premix formed by the main injection GM, it is possible to stabilize the self-ignition timing of the premix formed by the second pre-injection G2 not only at the time of a steady state, but also the time of a transient state. As a result, it is possible to stabilize the self-ignition timing of the premix formed by the main injection GM, so it is possible to precisely control the main self-ignition timing to the target main self-ignition timing.

Further, in the present embodiment, the interval from the crank angle corresponding to the injection timing of the primary auxiliary fuel to the crank angle corresponding to the injection timing of the secondary fuel becomes larger than the interval from the crank angle corresponding to the injection timing of the secondary fuel to the crank angle corresponding to the injection timing of the main fuel. Due to this, it is possible to make the premixes formed by injections after injecting the fuel divided self-ignite in stages after performing the main injection GM.

Above, embodiments of the present disclosure were explained, but the above embodiments only show some of the examples of application of the present disclosure. They do not limit the technical scope of the present disclosure to the specific constitutions of the embodiments.

For example, in the above embodiments, the target injection timing W1 of the first pre-injection G1 was strictly set based on the target injection amount A1 and the engine rotational speed so as to make the premix formed by the first pre-injection G1 self-ignite after being made a lean premix with an equivalent ratio $\phi$ of roughly less than 1. If providing a certain constant time or more of time for premixing, the premix formed by the first pre-injection G1 can be made a lean premix with an equivalent ratio $\phi$ of roughly less than 1 regardless of the target injection amount A1. Therefore, the target injection timing W1 of the first pre-injection G1 may also be set based on the engine rotational speed regardless of the target injection amount A1. Further, target injection timing W2 of the second pre-injection G2 may similarly be set based on the engine rotational speed regardless of the target injection amount A2.

The invention claimed is:

1. A control device for an internal combustion engine for controlling an internal combustion engine provided with:
   an engine body; and
   a fuel injector injecting fuel into a combustion chamber of the engine body,
   the control device comprising a combustion control part configured to sequentially inject at least a primary auxiliary fuel, secondary auxiliary fuel, and main fuel from the fuel injector in predetermined operating regions, cause compressive ignition sequentially from a premix containing the primary auxiliary fuel after injection of the main fuel, and cause compressive ignition of a premix containing the main fuel using heat generated when causing compressive ignition of a premix containing the secondary auxiliary fuel,
   the combustion control part configured so as to set a target injection amount and target injection timing of the primary auxiliary fuel so that a peak value and a slant at the start of combustion of a heat generation rate pattern formed by the premix containing the primary auxiliary fuel is smaller than peak values and slants at the start of combustion of heat generation rate patterns formed by the premixes containing the secondary auxiliary fuel and the main fuel.

2. The control device for internal combustion engine according to claim 1, wherein
   the combustion control part is configured so as to set the target injection amount and target injection timing of the primary auxiliary fuel so that the premix containing the primary auxiliary fuel first burns by compressive ignition after an equivalent ratio of the premix becomes less than 1.

3. The control device for internal combustion engine according to claim 1, wherein
   the combustion control part is configured to set a target injection amount and target injection timing of the secondary auxiliary fuel so that the premix containing the secondary auxiliary fuel burns by compressive ignition when an equivalent ratio of the premix containing the secondary auxiliary fuel is 1 to 2 after the premix containing the primary auxiliary fuel starts to burn by compressive ignition.

4. The control device for internal combustion engine according to claim 1 further comprising a first auxiliary fuel injection timing setting part configured to set the target injection timing of the primary auxiliary fuel based on the target injection amount of the primary auxiliary fuel and engine rotational speed so that a time from the target injection timing of the primary auxiliary fuel to a self-ignition timing of the main fuel is a first premixing time corresponding to the target injection amount of the primary auxiliary fuel regardless of the engine rotational speed.

5. The control device for internal combustion engine according to claim 4, wherein
the combustion control part further comprises:
an overall fuel injection amount setting part configured to set an overall fuel injection amount based on an engine load; and
a distribution part configured to distribute a remaining injection amount, calculated by subtracting a preset target injection amount of the main fuel from the overall fuel injection amount, between the target injection amount of the primary auxiliary fuel and the target injection amount of the secondary auxiliary fuel,
the overall fuel injection amount setting part is configured to as to increase the overall fuel injection amount when the engine load is high compared to when it is low, and
the distribution part is configured so as to raise a ratio of the target injection amount of the primary auxiliary fuel to the remaining fuel amount when the engine load is high compared to when it is low.

6. The control device for internal combustion engine according to claim 4, wherein
the combustion control part further comprises a second auxiliary fuel injection timing setting part configured to set the target injection timing of the secondary auxiliary fuel based on the target injection amount of the secondary auxiliary fuel and engine rotational speed so that a time from the target injection timing of the secondary auxiliary fuel to a self-ignition timing of the main fuel is a predetermined second premixing time shorter than the first premixing time regardless of the engine rotational speed.

7. The control device for internal combustion engine according to claim 1, wherein
an interval from a crank angle corresponding to the injection timing of the primary auxiliary fuel to a crank angle corresponding to the injection timing of the secondary fuel is larger than an interval from a crank angle corresponding to the injection timing of the secondary fuel to a crank angle corresponding to the injection timing of the main fuel.

* * * * *